(12) United States Patent
Majewski et al.

(10) Patent No.: US 9,085,681 B2
(45) Date of Patent: Jul. 21, 2015

(54) LOW GLOSS IONOMER-BASED CAPSTOCK

(75) Inventors: Thomas Majewski, Parma, OH (US);
Hari Rajaraman, Hudson, OH (US);
Roman B. Hawrylko, Avon Lake, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 13/984,775

(22) PCT Filed: Feb. 9, 2012

(86) PCT No.: PCT/US2012/024553
§ 371 (c)(1),
(2), (4) Date: Aug. 9, 2013

(87) PCT Pub. No.: WO2012/109489
PCT Pub. Date: Aug. 16, 2012

(65) Prior Publication Data
US 2013/0317139 A1    Nov. 28, 2013

Related U.S. Application Data

(60) Provisional application No. 61/441,592, filed on Feb. 10, 2011.

(51) Int. Cl.
C08L 23/06 (2006.01)
C08L 23/00 (2006.01)
B32B 27/08 (2006.01)
B32B 27/18 (2006.01)
B32B 27/20 (2006.01)
B32B 27/30 (2006.01)
B32B 27/32 (2006.01)

(52) U.S. Cl.
CPC .................. *C08L 23/06* (2013.01); *B32B 27/08* (2013.01); *B32B 27/18* (2013.01); *B32B 27/20* (2013.01); *B32B 27/308* (2013.01); *B32B 27/32* (2013.01); *B32B 2264/102* (2013.01); *B32B 2264/104* (2013.01); *B32B 2307/408* (2013.01); *B32B 2307/4026* (2013.01); *B32B 2307/712* (2013.01); *B32B 2419/00* (2013.01); *B32B 2451/00* (2013.01)

(58) Field of Classification Search
CPC . C08L 23/06; C08L 23/0815; C08L 23/0876; C08B 27/08; C08B 27/32; C08B 27/308; C08B 27/20; C08B 27/18
USPC ............ 524/91, 151, 315, 423, 492; 525/191, 525/240
See application file for complete search history.

(56) References Cited

U.S. PATENT DOCUMENTS

| | | | |
|---|---|---|---|
| 4,480,061 A * | 10/1984 | Coughlin et al. | 524/13 |
| 6,187,424 B1 | 2/2001 | Kjellqvist et al. | |
| 6,849,310 B2 * | 2/2005 | Willett | 428/31 |
| 7,625,968 B2 | 12/2009 | Durand et al. | |
| 7,816,000 B2 | 10/2010 | Sparks et al. | |
| 2001/0036543 A1 | 11/2001 | Sparks et al. | |
| 2004/0161623 A1 | 8/2004 | Domine et al. | |
| 2005/0267261 A1 | 12/2005 | Plaver | |
| 2006/0019113 A1 | 1/2006 | Sparks et al. | |
| 2008/0226872 A1 | 9/2008 | Sparks et al. | |
| 2010/0021753 A1 | 1/2010 | Hojabr et al. | |
| 2010/0159213 A1 | 6/2010 | Przybylinski et al. | |

FOREIGN PATENT DOCUMENTS

| | | |
|---|---|---|
| KR | 10-2003-0012453 | 2/2003 |
| WO | 2012/103378 | 8/2012 |

* cited by examiner

*Primary Examiner* — Nathan M Nutter
(74) *Attorney, Agent, or Firm* — John H. Hornickel; Maria H. Hoke

(57) ABSTRACT

A low gloss capstock compound is disclosed. The combination of gloss inhibiting agents, metal-based ionomer thermoplastic resins, and acid scavenger added to conventional polyethylene polymer resin achieves a gloss angle at 85° of below 10 GU. Optionally, the compound can also include weathering agents to improve outdoor durability. The compound can be fully formulated or a masterbatch for let-down into polymer to form the fully formulated compound.

15 Claims, No Drawings

LOW GLOSS IONOMER-BASED CAPSTOCK

CLAIM OF PRIORITY

This application claims priority from U.S. Provisional Patent Application Ser. No. 61/441,592 and filed on Feb. 10, 2011, which is incorporated by reference.

FIELD OF THE INVENTION

This invention relates to a polymer compound for use as a low gloss capstock material.

BACKGROUND OF THE INVENTION

Plastic has taken the place of other materials in a variety of industries. In the packaging industry, plastic has replaced glass to minimize breakage, reduce weight, and reduce energy consumed in manufacturing and transport. In other industries, plastic has replaced metal to minimize corrosion, reduce weight, and provide color-in-bulk products. Recently, an entire industry has arisen called "wood polymer composites" ("WPC").

WPC has begun to replace wood in building and other construction materials where the wood is susceptible to rotting, warping, or discoloration. The advent of thermoplastic biofiber composites has made outdoor decks, porches, railings, windows and stairways more durable. With structural issues resolved, the next key to growing this market is making the plastic composite look like naturally-colored or stained wood.

The ability of WPC to simulate the appearance of natural wood, including its surface texture and wood grain coloration, and to provide greater durability compared to wood, are critical to WPC materials successfully replacing the natural wood itself. The colorants and additives used to achieve these characteristics, however, significantly add to the WPC products' costs. To reduce these costs, manufacturers have begun to incorporate various colorants and additives into a thinner outer layer, or "capstock", which covers the core construction material, thus reducing the total amount of colorants and additives per linear foot of product.

SUMMARY OF THE INVENTION

What the art needs is a plastic material that simulates the appearance of wood. To achieve a wood-like appearance a key factor is that the material must exhibit low gloss, literally to minimize the shine that would otherwise betray the capstock as being plastic instead of wood.

The present invention solves this problem in the art with a polymer compound that comprises (a) polyethylene in both pellet form and powder or flake form; (b) metal-based ionomer thermoplastic resin, wherein the metal is selected from the group consisting of magnesium and zinc; (c) acid scavenger for the metal-based ionomer thermoplastic resin; (d) gloss inhibiting agents comprising silica and barium sulfate, wherein, when a surface of a strip of the compound is tested according to ASTM D523, D2457, the surface has a Gloss Angle at 85° of less than 10 GU.

If the material is to be used in an outdoor setting exposed to the environment, the compound also preferably needs to be durable beyond the durability which plastic inherently has over wood susceptible to rotting. A key measure of durability is weather-ability, which represents resistance to outdoor exposure to heat, sunlight and UV degradation. Particularly, the art needs a capstock material to cover the core WPC material providing both a wood-like appearance and durability against the effects of both natural sources such as wind, rain, and sun and human sources such as foot traffic, furniture moving, etc.

Optionally but preferably, the polymer compound also comprises weathering agents comprising ultra-violet stabilizer, hindered amine light stabilizer, and anti-oxidant.

The compounds of the present invention satisfy the requirements of low gloss and durability, as measured Gloss Angle identified in the Examples below. Optionally but preferably, the compound also satisfies the requirements of Weatherability, also identified in the Examples below.

Regardless of the construction of the underlying substrate, capstocks made from the compounds of the present invention give the aesthetic and ornamental appearance of wood and also the structural and functional sunlight and stress resistance.

EMBODIMENTS OF THE INVENTION

Polyethylene

Polyethylene refers to a polymer made of ethylene-derived monomeric units. The polyethylene can be a homopolymer or a copolymer, including a terpolymer, having other monomeric units. Illustrative monomers may include alpha-olefins including, but not limited to, propylene, 1-butene, 1-pentene, 1-hexene, 1-octene, 1 decene and 4-methyl-1-pentene. One embodiment of the invention is a high density polyethylene (HDPE) resin having a melt flow index of about 0.2 to about 0.8 g/10 min., when measured using ASTM D1238 (2.16 kg at 190° C.), and a density of from about 0.93 to about 0.97 and preferably from about 0.95 to about 0.96 g/cm$^3$.

It has been found that a mixture of forms of HDPE is helpful for making compounds of the present invention. The amount of HDPE for the compound is divided between pellets of HDPE and powder or flakes of HDPE, in a division ranging from about 80:20 to about 50:50 and preferably from about 65:35 to about 55:45 pellets:powder. While not being limited to a particular theory, it is believed that the combination of pellets and powder or flakes promotes a homogeneous blend and optimum compounding during manufacture of the compound.

Metal-Based Ionomer Thermoplastic Resin

The ionomer thermoplastic resin is an acid ethylene terpolymer in which some of the acid groups have been partially neutralized to salts of alkali metal cations, transition metal cations, or alkaline earth metal cations, or combinations of two or more thereof.

Examples of ionomer thermoplastic resins include Surlyn® 6320 resin, Surlyn® 1857 resin, and Surlyn® 9910 resin manufactured by E. I. Du Pont de Nemours and Company of Wilmington, Del.

Surlyn® 6320 thermoplastic resin is an advanced ethylene/acid/acrylate terpolymer, in which some of the methacrylic acid (MAA) groups have been partially neutralized with magnesium ions.

Surlyn® 1857 thermoplastic resin is an advanced ethylene/methacrylic acid (E/MAA) copolymer, in which the MAA groups have been partially neutralized with zinc ions.

Surlyn® 9910 thermoplastic resin is an advanced ethylene/methacrylic acid (E/MAA) copolymer, in which the MAA groups have been partially neutralized with zinc ions.

Other metals use in ionomer thermoplastic resins include sodium and lithium.

Acid Scavengers for Ionomer Thermoplastic Resin

The acidic nature of the ionomer thermoplastic resin needs to be addressed in compound of the invention to minimize oxidative effect of the use of such ionomeric resins. Suitable scavengers for acid in the compound include stearyl lactylate, sodium bicarbonate, magnesium-aluminum hydrotalcite, and combinations thereof.

Stearyl lactylate acts as an acid scavenger by neutralizing any acid catalyst residues.

Sodium bicarbonate acts as an acid scavenger by as a strong base which neutralizes free acid groups.

Magnesium-aluminum hydrotalcite acts as an acid scavenger by reacting with and deactivating residual acid catalysts used to produce polymers and elasomers.

Of the choices, magnesium-aluminum synthetic hydrotalcite is preferred.

Gloss Inhibiting Agents

Polyolefin polymers, such as high density polyethylene and polyolefin elastomers, have a natural gloss from their surfaces after molding or extruding into their final shape. As anyone who has seen a plastic article such as a polyethylene sheet or film, the high reflectivity of light shining upon the surface of that sheet or film is a readily recognized attribute of a thermoplastic.

The present invention minimizes that gloss at a variety of angles of viewing, but most important at 85° to the surface, almost directly orthogonal to a flat surface.

The building and construction industry has determined that the marketplace of consumers demands that Gloss Angle at 85° according to ASTM D523, D2457 be less than 10. Visual appearance of a low gloss, i.e., a single digit value at 85° is a requirement of the market and this invention. Desirably, the 85° Gloss Angle is as low as possible, less than 9 or 7 or 5, as can be achieved. One embodiment of the invention has resulted in an 85° Gloss Angle of less than 5.

To minimize gloss, the present invention adds a combination of two different inorganic chemicals as gloss inhibiting agents, silica and barium sulfate. It has been found that both are needed to provide the necessary reduction of gloss.

Silica is a common term for silicon dioxide and can be mined or manufactured via precipitation from solution. Particle sizes of silica can range from about 5 to about 12 and preferably from about 9 to about 11 micrometers. Pore volumes of the particles can range from about 0.4 to about 2.0 and preferably from about 1.0 to about 1.2 ml/g Preferably, the silica is not agglomerated or aggregated, nor is the silica surface-treated.

Commercially available silica is sold as Silcron brand silicas by Millenium Chemicals of Hunt Valley, Md. and Gasil™ brand silicas from INEOSSilicas of Joliet, Ill. Of the available commercial choices, Gasil™ IJ45 silica is presently preferred because its 10.1 micrometer average particle size.

Barium sulfate can be mined or manufactured. If manufactured by precipitation reaction from barium sulfide, it is known as blanc fixe barium sulfate. Particle sizes of barium sulfate can range from about 0.5 to about 5 and preferably from about 0.7 to about 3 micrometers.

Commercially available precipitated barium sulfate is sold by Brenntag Specialties of South Plainfield, N.J., among other known sources.

While not being limited to a particular theory, it is believed that the combination of silica and barium sulfate provides desirable matting in the compound, resulting in reduced surface gloss in the compound when formed into a capstock.

Optional Weathering Agents

Compounds of the present invention optionally but preferably include the presence of weathering agents in order to preserve original coloration and structure of the compound after extrusion into the form of a capstock and installation of that capstock in an outside building or other construction item.

Ultra-violet radiation will discolor or bleach out the original color of the capstock of the compound unless different types stabilizers and anti-oxidants are present.

The first type of weathering agent is an ultra-violet light absorber, such as 2-(2H-benzotriazol-2-yl)-4,6-ditertpentylphenol, marketed by BASF (formerly Ciba) as Tinuvin™ 328 UV absorber.

The second type of weathering agent is a hindered amine light stabilizer (HALS), such as N,N',N",N"'-tetrakis(4,6-bis (butyl-(N-methyl-2,2,6,6-tetramethylpiperidin-4-yl)amino) triazin-2-yl)-4,7-diazadecan-1,10-diamine and Butanedioic acid, dimethyl ester, polymer with 4-hydroxy-2,2,6,6-tetramethyl-1-piperidineethanol, marketed by Sabo SPA as SabooStab UV 119 HALS.

The third type of weathering agent is an antioxidant combining a high molecular weight hindered phenolic antioxidant with a phosphite antioxidant, such as a mixture of Tris(2,4-di-tert-butylphenyl)phosphite and Tetrakis[methylene-3-(3, 5-di-tert-butyl-4-hydroxyphenyl)propionate]methane in a 50:50 weight ratio, marketed by Songwon Ind. Co. Ltd. as Songnox 11B antioxidant.

Other Optional Functional Additives

The polymer compounds of the present invention can include conventional plastics additives in an amount that is sufficient to obtain a desired processing or performance property for the compound. The amount should not be wasteful of the additive or detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include other antioxidants; biocides (antibacterials, fungicides, and mildewcides); surfactants; intercalated organoclays; other ultraviolet stabilizers; anti-static agents; bonding, blowing and foaming agents; dispersants; fillers and extenders, such as biofibers and particularly wood fiber or flour; fire and flame retardants and smoke suppressants; fly ash; impact modifiers; initiators; lubricants; micas; plasticizers; processing aids; release agents; silanes, titanates and zirconates; slip and anti-blocking agents; stabilizers; stearates; ultraviolet light absorbers; viscosity regulators; waxes; pest repellants; and combinations of them.

Optional Colorant

Colorant can be a pigment or a combination of pigments. The choice of colorants depends on the ultimate color and performance desired by the designer for the capstock. Pigments are preferred for durability to resist discoloration because of exposure to ultraviolet light.

The science of color is well known to those skilled in the art. Without undue experimentation, one can use color matching techniques to identify a particular location in spherical color space. For example, one skilled in the art can use the teachings of PCT Patent Publication WO 2004/095319 to digitally map color space using specific polymer carriers and colorants as raw material ingredients. Alternatively, one can make small samples called plaques for visual review.

Colorants are commercially available from a number of sources well known to those skilled in the art. Commercially available pigments are well known to those skilled in the art and include organic and inorganic colorant chemistries. Commercial sources for pigments include multinational companies such as BASF, Bayer, Ciba-Geigy, Color-Chem International, Sun Chemical, Zhuhai Skyhigh Chemicals, and others identified at Internet Web Sites such as http://www.colorpro.com/info/vendors/colorant.html and http://dir.yahoo.com/Business_and_Economy/Business_to_Business/Chemicals_and_Allied_Products/Pigments_and_Dyes/

Table 1 lists 51 commercially available pigment colorants in a variety of primary and secondary colors, 47 chromatics, 3 blacks, and 1 white.

TABLE 1

Commercial Pigment Colorants

| Raw Material Name | CI_Name | Family | COLOR |
|---|---|---|---|
| TIOXIDE R-FC6 WHITE | PIGMENT WHITE 6 | INORGANIC | WHITE |
| REGAL 660R BLACK POWDER | PIGMENT BLACK 7 | ORGANIC | |
| MPC CHANNEL BLACK | PIGMENT BLACK 7 | ORGANIC | |
| BK-5099 BLACK OXIDE | PIGMENT BLACK 11 | INORGANIC | |
| HELIOGEN BLUE K7090 | PIGMENT BLUE 15:3 | ORGANIC | BLUE |
| Heliogen Blue K6903 | PIGMENT BLUE B 15:1 | ORGANIC | BLUE |
| 34L2000 AZURE BLUE | PIGMENT BLUE 28 | INORGANIC | BLUE |
| 34L2001 AMAZON BLUE | PIGMENT BLUE 36 | INORGANIC | BLUE |
| NUBIX G-58 ULTRAMARINE BLUE | PIGMENT BLUE 29 | INORGANIC | BLUE |
| NUBIX C-84 ULTRAMARINE BLUE | PIGMENT BLUE 29 | INORGANIC | BLUE |
| NUBIX E-28 ULTRAMARINE BLUE | PIGMENT BLUE 29 | INORGANIC | BLUE |
| HELIOGEN GREEN K-8730 | PIGMENT GREEN 7 | ORGANIC | GREEN |
| HELIOGEN GREEN K 8605 | PIGMENT GREEN 7 | ORGANIC | GREEN |
| CHROMIUM OXIDE GREEN G-6099 | PIGMENT GREEN 17 | INORGANIC | GREEN |
| CROMOPHTAL ORANGE GP | PIGMENT ORANGE 64 | ORGANIC | ORANGE |
| 2920 BRILLIANT ORANGE | PIGMENT ORANGE 79 | ORGANIC | ORANGE |
| NOVAPERM RED F5RKA | PIGMENT RED 170 | ORGANIC | RED |
| 225-2480 Sunbrite Scarlet 60:1 | Pigment Red 60:1 | ORGANIC | RED |
| IRGALITE RED LCB | PIGMENT RED 53:1 | ORGANIC | RED |
| DCC-2782 Barium 2B Red | Pigment Red 60:1 | ORGANIC | RED |
| Lithol Scarlet 4451 | Pigment Red 48:2 | ORGANIC | RED |
| CROMOPHTAL RED 2020 | PIGMENT VIOLET 19 | ORGANIC | RED |
| CROMOPHTAL MAGENTA P | PIGMENT RED 202 | ORGANIC | RED |
| CROMOPHTAL PINK PT | PIGMENT RED 122 | ORGANIC | RED |
| PALIOGEN RED K 3911 HD | PIGMENT RED 178 | ORGANIC | RED |
| CROMOPHTAL RED 2030 | PIGMENT RED 254 | ORGANIC | RED |
| CROMOPHTAL RED 2028 | PIGMENT RED 254 | ORGANIC | RED |
| Colortherm Red 110M | PIGMENT RED 101 | INORGANIC | RED |
| Colortherm Red 130M | PIGMENT RED 101 | INORGANIC | RED |
| Colortherm Red 180M | PIGMENT RED 101 | INORGANIC | RED |

TABLE 1-continued

Commercial Pigment Colorants

| Raw Material Name | CI_Name | Family | COLOR |
|---|---|---|---|
| CINQUASIA VIOLET RT-891-D | PIGMENT VIOLET 19 | ORGANIC | VIOLET |
| CROMOPHTAL VIOLET GT | PIGMENT VIOLET 23 | ORGANIC | VIOLET |
| PREMIER VU UMV (6112) | PIGMENT VIOLET 15 | INORGANIC | VIOLET |
| SICOTAN BROWN K 2750 FG | PIGMENT YELLOW 164 | INORGANIC | BROWN |
| FERRITAN FZ-1000 | PIGMENT YELLOW 119 | INORGANIC | Tan |
| NUBITERM Y-905K ZINC FERRITE | PIGMENT YELLOW 119 | INORGANIC | Tan |
| PV FAST YELLOW HG | PIGMENT YELLOW 180 | ORGANIC | YELLOW |
| IRGALITE YELLOW WGPH | PIGMENT YELLOW 168 | ORGANIC | YELLOW |
| PV FAST YELLOW HGR (11-3071) | PIGMENT YELLOW 191 | ORGANIC | YELLOW |
| PALIOTOL YELLOW K 2270 | PIGMENT YELLOW 183 | ORGANIC | YELLOW |
| CROMOPHTAL YELLOW HRPA | PIGMENT YELLOW 191:1 | ORGANIC | YELLOW |
| CROMOPHTAL YELLOW GRP | PIGMENT YELLOW 95 | ORGANIC | YELLOW |
| IRGALITE YELLOW WSR-P | PIGMENT YELLOW 62 | ORGANIC | YELLOW |
| CROMOPTHAL YELLOW 3RLP | PIGMENT YELLOW 110 | ORGANIC | YELLOW |
| 9766 FD&C YELLOW # 6 | PIGMENT YELLOW 104 | ORGANIC | YELLOW |
| 9765 FD&C YELLOW # 5 | PIGMENT YELLOW 100 | ORGANIC | YELLOW |
| PALIOTOL YELLOW K 0961 (HD) | PIGMENT YELLOW 138 | ORGANIC | YELLOW |
| SICOPLAST YELLOW 10-0770 | PIG YEL 138/ PIG YEL 183 | ORGANIC | YELLOW |
| SICOTAN YELLOW K 2001 FG | PIGMENT BROWN 24 | INORGANIC | YELLOW |
| SICOTAN YELLOW K 1011 | PIGMENT YELLOW 53 | INORGANIC | YELLOW |
| COLORTHERM 10 | PIGMENT YELLOW 42 | INORGANIC | YELLOW |

Achievement of a color match of a plaque with a desired color from the creativity of a designer or a pre-arranged color standard such as Pantone® color standards from an inventory of commercially available colorants is relatively straightforward for a skilled color matcher, even if a few iterations are required to satisfy the customer.

Pigments for this invention can include pigments intended for to simulate the appearance of natural wood. For example, to simulate the coloration of cedar wood, a combination of four pigments can be used: tan, white, red, and black.

Table 2 shows the acceptable, desirable, and preferable ranges of ingredients for the polymer compound of the present invention. The compound can comprise, consist essentially, or consist of the following ingredients.

TABLE 2

Ranges of Ingredients for Compound

| Ingredient (Wt. Percent) | Acceptable | Desirable | Preferable |
|---|---|---|---|
| Polyethylene (pellet form) | 40-55 | 45-53 | 50-52 |
| Polyethylene (powder or flake form) | 25-40 | 28-38 | 30-34 |

TABLE 2-continued

Ranges of Ingredients for Compound

| Ingredient (Wt. Percent) | Acceptable | Desirable | Preferable |
|---|---|---|---|
| Metal-based Ionomer Thermoplastic Resin | 5-50 | 5-25 | 10-20 |
| Acid Scavenger | 0.1-0.4 | 0.1-0.4 | 0.1-0.3 |
| Silica Gloss Inhibiting Agent | 1-5 | 1-4 | 1-3 |
| Barium Sulfate Gloss Inhibiting Agent | 1-5 | 1-3 | 1-2 |
| Optional UVA Absorber | 0-0.4 | 0-0.3 | 0.1-0.2 |
| Optional HALS Stabilizer | 0-0.5 | 0.1-0.5 | 0.3-0.5 |
| Optional Anti-Oxidant | 0-0.4 | 0.1-0.3 | 0.1-0.2 |
| Optional Colorant | 0-5 | 1-4 | 1-3 |
| Other Optional Functional Additives | 0-10 | 0-7 | 0-5 |

The form of the compound can be fully formulated or made into a masterbatch, a concentrated amount of the gloss inhibiting agents and, optionally, also the weathering agents in a smaller weight percentage of polymer resin(s). The masterbatch can be transported to the location of final plastic article formation and combined with the remainder of polyethylene and/or polyolefin elastomer at the time of extrusion or molding. Table 3 shows the acceptable, desirable, and preferable ranges of ingredients for the polymer compound of the present invention in the form of a masterbatch, based on a 25% usage level in the final compound, otherwise known as a 4:1 "let-down" ratio. The masterbatch can comprise, consist essentially, or consist of the following ingredients.

TABLE 3

Ranges of Ingredients for Masterbatch

| Ingredient (Wt. Percent) | Acceptable | Desirable | Preferable |
|---|---|---|---|
| Polyethylene (pellet form) | 0-25 | 0-15 | 0-5 |
| Polyethylene (powder or flake form) | 0-40 | 15-40 | 25-35 |
| Metal-based Ionomer Thermoplastic Resin | 20-80 | 40-80 | 50-80 |
| Acid Scavenger | 0.5-3 | 1-3 | 1-2 |
| Silica Gloss Inhibiting Agent | 5-20 | 5-15 | 5-10 |
| Barium Sulfate Gloss Inhibiting Agent | 4-20 | 4-14 | 4-8 |
| Optional UVA Absorber | 0-5 | 0.25-3 | 0.5-1.5 |
| Optional HALS Stabilizer | 0-5 | 0.5-5 | 1-5 |
| Optional Anti-Oxidant | 0-5 | 0.1-3 | 0.5-1.5 |
| Optional Colorant | 0-50 | 0-35 | 0-20 |
| Other Optional Additives | 0-20 | 0-10 | 0-5 |

Processing

The preparation of compounds of the present invention is uncomplicated once the proper ingredients have been selected. The compound of the present can be made in batch or continuous operations.

Mixing in a continuous process typically occurs in an extruder that is elevated to a temperature that is sufficient to melt the polymer matrix with addition either at the head of the extruder or downstream in the extruder of the solid ingredient additives. Extruder screw speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering, whether one employs the compound or the masterbatch in combination with polymer(s). Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

Compounds of the invention can be used to make capstocks, relatively thin outer layers attached or adhered to substrates used in the building and construction industry. The capstocks provide durability to the underlying substrate and a more aesthetically pleasing non-glossy appearance.

The substrate on which the capstock resides can be any metallic, ceramic, or polymeric material. Preferably, the substrate is polymeric.

Polymer composites used in the building and construction industries include polyolefins, poly(vinyl halides), polystyrenes, polycarbonates, and other engineering grade polymers suitable for use in the particular shape of construction. Of these choices, polyethylene is preferred because of the compatibility of that polymer resin with compounds of the present invention serving as the capstock.

The polymer composite of the substrate can include fillers to reduce cost of polymer. Fillers can be metallic, ceramic, or bio-derived. Among possible fillers are wood fiber, fly ash, granulated rubber particles, and any other small size product of commerce which needs to be recycled in a sustainable way.

The capstock can be made separately from the substrate and subsequently fused or adhered to the substrate. Alternatively, the capstock can be co-extruded with the substrate.

The shape of the substrate, and hence the purpose of the capstock, can vary according to choice of architects and other building designers. Capstocks can be employed as the outer surface in windows and doors, decking and fencing, railings and spindles, stairways and steps, posts and pillars, shutters and fascia, etc. Currently, the largest volume of wood polymer composites used as substrates are deck planks and other lumber construction pieces. Capstocks of compounds of the present invention can be utilized to provide both a better durable surface than wood itself and a more aesthetically pleasing surface than the substrate itself.

Moreover, with the capstock covering the exposed surface(s) of the substrate, there need not be coloration or other finishing ingredients in the substrate. The substrate can be made with less expense, resulting in the overall construction item having all of the structural properties needed for the substrate and all of the durability and non-glossy appearance properties of the capstock.

General contractor home construction and do-it-yourself home improvement home owners both can benefit from composite substrates which have capstocks made according to the invention.

The thickness of the capstock depends on the thickness and construction purpose of the substrate. Generally, the thickness of the capstock can range from about 1 mm to about 4 mm and preferably from about 1.5 mm to about 3 mm. Stated another way, the thickness of the capstock relative to the thickness of the substrate can range from about 3% to about 20% and preferably from about 5% to about 10%.

The capstock can cover only the surface exposed to the most viewing by users of the construction item or can cover any other portion or the entire remainder of all surfaces of the substrate. The capstock should cover at least all surfaces which are exposed to sunlight, in order that the substrate not be exposed to ultra-violet light and fade to a different color than the capstock which has weathering agent protection as described above.

Coloration of the capstock can mimic colors of popular wood species, such as redwood or cedar. Alternatively, the coloration can be chosen to be any color according to design choice for decorative or informative effect.

The outer surface of the capstock can be smooth or textured as desired, with a preference for some texturing if used where foot traffic is likely. Desirably, the capstock texture can resemble wood grain or other tactile effect to enhance its simulation of finished wood structures.

With capstock from compound of the invention, one of ordinary skill in building materials can protect substrates with a non-glossy capstock in an economical way with aesthetically pleasing results, preferably also with years of durability to outdoor uses.

Specifically, using QUV Weathering test explained below, the compound in the form of a test strip can have less than 1 Delta E unit CIELAB, desirably less than 0.5, and preferably less than 0.4 over 2000 hours of testing.

Specifically, using the Gloss Angle test explained below, test strips of the compound can have an 85° gloss angle of less than 10 Gloss Units, namely a single digit gloss angle.

The invention is further explained in the Examples.

EXAMPLES

Table 4 shows the ingredients and their commercial sources.

TABLE 4

| Ingredient | Commercial Company | Location of Company |
| --- | --- | --- |
| 0.38 melt pellet HDPE | Dow Chemical | Midland, MI |
| 7 melt pellet HDPE | CP Chem | Houston, TX |
| 0.5 melt flake HDPE | Innovene | Chicago, IL |
| 0.8 melt flake HDPE | Dow Chemical | Midland, MI |
| Tinuvin 328 UVA | BASF | Florham Park, NJ |
| Tinuvin 783 UV HALS | BASF | Florham Park, NJ |
| Sabostab UV 119 (HALS) Hindered Amine | Sabo Srl | Levate, Italy |
| Songnox 11B PW AO | Songwon Ind. Co. Ltd. | Uisan, Korea |
| Talc 399 Talc | Mineral & Pigment Solutions | South Plainfield, NJ |
| GASIL IJ45 Silica | IneosSilicas | Joliet, IL |
| Blanc Fixe Barium Sulfate | Brenntag Specialties | South Plainfield, NJ |
| Pationic 930 stearyl lactylate | American Ingredients Co. | Kansas City, MO |
| Sodium bicarbonate | Church and Dwight Co. | Princeton, NJ |
| Magnesium-aluminum synthetic hydrotalcite | Kisuma Chemical B.V. | Veendam, the Netherlands |
| Surlyn 8940 Sodium | DuPont | Wilmington, DE |
| Surlyn 6320 Magnesium based | DuPont | Wilmington, DE |
| Surlyn 9910 Zinc Ionomer | DuPont | Wilmington, DE |
| Surlyn 1857 Zinc Ionomer | DuPont | Wilmington, DE |
| Nylon 12 | Ube Industries | Tokyo, Japan |
| E43 MAH coupling agent | Westlake Polymers | Houston, TX |
| E25 MAH coupling agent | Westlake Polymers | Houston, TX |
| Color pigment | PolyOne Corporation | Avon Lake, OH |

Comparative Example A was a control of a mixture of two different types of high density polyethylene (HDPE). Comparative Examples B-X were unsuccessful attempts to formulate a capstock with a single digit 85° gloss angle and other suitable physical properties. Examples 1-4 were embodiments of the claimed invention.

Preparation of Comparative Examples Q, R, S, V, and W

Batch ingredients for each of Comparative Examples Q, R, S, V, and W were pre-weighed, including a contrasting colorant to measure 85° gloss angle, and blended for three minutes using a Red Devil Model 5400 paint shaker.

Blends of each of Comparative Examples Q, R, S, V, and W were then melt compounded using a Brabender Plasticorder machine with a single screw extruder attachment having a 7.62 cm (3 inch) tape/strip die. The single screw had a L:D ratio of 20:1 and 2:1 compression. Temperatures in the two-barrel Zones and the Die were set at 188° C. Screw speed was 40 RPM. Brabender strips 7.6 cm wide by 0.5 mm thick were the product form, cut into pieces approximately 25 cm long.

Preparation of Comparative Examples A-P, T, U, and X

Batch ingredients for Comparative Examples A-P, T, U, and X were pre-weighed and blended first before being melt compounded using a twin screw extruder with a strand die resulted in cylindrical pellets. Table 5 shows the extruder temperature and other processing conditions.

Pellets of Comparative Examples A-P, T, U, and X were then further melt compounded, in the same manner as Comparative Examples Q, R, S, V, and W, using a Brabender Plasticorder machine with a single screw extruder attachment having a 7.62 cm (3 inch) tape/strip die. The single screw had a L:D ratio of 20:1 and 2:1 compression. Temperatures in the two-barrel Zones and the Die were set at 188° C. Screw speed was 40 RPM. Brabender strips 7.6 cm wide by 0.5 mm thick were the product form, cut into pieces approximately 25 cm long.

Preparation of Examples 1-4

Batch ingredients for Examples 1-4 were pre-weighed and blended first before being melt compounded using a twin screw extruder with a strand die resulted in cylindrical pellets. Table 5, broken into Parts A and B, shows the extruder temperature and other processing conditions. Pellets were the product form in natural polymer color.

Pellets of Examples 1-4 were then further melt compounded at a 98:2 weight percent ratio with cedar colorant, to serve as a contrasting agent for testing, using a Brabender Plasticorder machine with a conical twin screw extruder attachment having a 7.62 cm (3 inch) tape/strip die. The conical twin screw had a L:D ratio of 10.6:1. Temperatures in the three-barrel Zones and the Die were set at 188° C. Screw speed was 20 RPM. Brabender strips 7.6 cm wide by 0.5 mm thick were the product form, cut into pieces approximately 25 cm long.

Table 6, broken into Parts A, B, C, D, E, and F, shows the formulations of Comparative Examples A-X and Examples 1-4. Table 6, Parts A-F, also show the results of 85° Gloss Angle testing and QUV Weathering of Brabender strips of Comparative Example X and Examples 1-4 through 2000 hours.

The Gloss Angle test utilizes an average of four surface measurements on 25 cm long Brabender strip using a BYK/Gardner Micro Tri Gloss meter conforming to ASTM D523, D2457. The QUV Weathering test utilizes the Q-Lab QUV Solar Eye instrument with water spray and a UV340 lamp. Each cycle includes eight hours UV exposure at 70° C.±2.8° C., a five minute spray and 3 hours 55 minutes condensation at 50° C.±3° C. Data collection occurs every 500 hours. The overall test duration was 2000 hours.

TABLE 5

Part A

|  | Examples A-M | Examples N-P | Example Q | Example R | Example S | Example T |
|---|---|---|---|---|---|---|
| Extruder type | Brabender L/D 20:1 2:1 Single Screw | Liestritz 36 mm Twin Screw | NFM 58 mm Twin Screw | Coperion 25 mm Twin Screw | NFM 58 mm Twin Screw | Leistritz 32 mm Twin Screw |
| Machine Settings: | | | | | | |
| Feeder | NA | 50 | 100 | NA | 100 | NA |
| Melt Temp | NA | 170° C. | 205° C. | 190° C. | 205° C. | NA |
| Screw Speed | 40 | 300 | NA | NA | 450 | 190 |
| Rate | NA | 30 | NA | NA | 285 | NA |
| Die Holes | NA | NA | 31 | 7 | 31 | NA |
| Die type | 3 inch tape/strip | strand | strand | strand | strand | strand |
| Temperature Settings: | | | | | | |
| Zone 1 | 188° C. | 0 | 0 | 0 | 50 | 180° C. |
| Zone 2 | 188° C. | 150° C. | 150° C. | 150° C. | 150° C. | 200° C. |
| Zone 3 | | 170° C. | 160° C. | 180° C. | 180° C. | 205° C. |
| Zone 4 | | 170° C. | 160° C. | 200° C. | 180° C. | 210° C. |
| Zone 5 | | 170° C. | 170° C. | 200° C. | 180° C. | 210° C. |
| Zone 6 | | 170° C. | 170° C. | 200° C. | 180° C. | |
| Zone 7 | | 170° C. | 170° C. | 200° C. | 180° C. | |
| Zone 8 | | 170° C. | 170° C. | 200° C. | 180° C. | |
| Zone 9 | | 170° C. | 170° C. | 200° C. | 180° C. | |
| Zone 10 | | 170° C. | | 200° C. | | |
| Zone 10 Die (L) | | | 165° C. | | 180° C. | |
| Zone 11 Die (C) | | | 165° C. | | 180° C. | |
| Zone 12 Die (R) | | | 165 C | | 180° C. | |
| Die temp | 188° C. | NA | NA | 190° C. | NA | 205° C. |
| Amps | NA | NA | NA | NA | NA | 15 |
| Torque % | NA | NA | 60 | NA | 60 | NA |
| Head Pressure PSI | NA | NA | 200 | NA | 400 | NA |
| Vacuum | NA | on | on | on | on | NA |
| Screens | NA | none | none | NA | none | NA |
| Waterbath Temp | NA | NA | NA | NA | 21° C. | NA |

TABLE 5

Part B

|  | Example U | Example V | Example W | Example X | Examples 1-4 |
|---|---|---|---|---|---|
| Extruder type | Liestritz 36 mm Twin Screw | Coperion 25 mm Twin Screw | Coperion 25 mm Twin Screw | Coperion 25 mm Twin Screw | Leistritz 32 mm Twin Screw |
| Machine Settings: | | | | | |
| Feeder | 50 | 150 | NA | 77 | NA |
| Melt Temp | 170° C. | 200° C. | 180° C. | 280° C. | NA |
| Screw Speed | 300 | 1200 | NA | 1200 | 190 |
| Rate | 30 | 90 | NA | NA | NA |
| Die Holes | NA | 7 | 7 | 4 | NA |
| Die type | strand | strand | strand | strand | strand |

TABLE 5-continued

Part B

| | Example U | Example V | Example W | Example X | Examples 1-4 |
|---|---|---|---|---|---|
| Temperature Settings: | | | | | |
| Zone 1 | 0 | 50 | 0 | 50 | 180° C. |
| Zone 2 | 150° C. | 200° C. | 150° C. | 200° C. | 200° C. |
| Zone 3 | 170° C. | 200° C. | 170° C. | 225° C. | 205° C. |
| Zone 4 | 170° C. | 200° C. | 170° C. | 240° C. | 210° C. |
| Zone 5 | 170° C. | 200° C. | 170° C. | 240° C. | 210° C. |
| Zone 6 | 170° C. | 200° C. | 170° C. | 240° C. | |
| Zone 7 | 170° C. | 200° C. | 170° C. | 225° C. | |
| Zone 8 | 170° C. | 200° C. | 170° C. | 225° C. | |
| Zone 9 | 170° C. | 200° C. | 170° C. | 225° C. | |
| Zone 10 | 170° C. | 200° C. | 170° C. | 225° C. | |
| Zone 10 Die (L) | | | | | |
| Zone 11 Die (C) | | | | | |
| Zone 12 Die (R) | | | | | |
| Die temp | NA | 200° C. | 180° C. | 225° C. | 205° C. |
| Amps | NA | NA | NA | NA | 12-15 |
| Torque % | NA | NA | NA | 74 | NA |
| Head Pressure PSI | NA | 230 | NA | NA | NA |
| Vacuum | on | on | on | NA | NA |
| Screens | none | NA | NA | NA | NA |
| Waterbath Temp | NA | 21° C. | NA | NA | NA |

TABLE 6

Part A

| | Example A | Example B | Example C | Example D | Example E |
|---|---|---|---|---|---|
| 0.38 melt pellet HDPE | 19.70% | 78.82% | 17.73% | 70.94% | 15.76% |
| 7 melt pellet HDPE | 0.00% | 0.00% | 0.00% | 0.00% | 0.00% |
| 0.5 melt flake HDPE | 0.00% | 0.00% | 0.00% | 0.00% | 0.00% |
| 0.8 melt flake HDPE | 78.82% | 19.70% | 70.94% | 17.73% | 63.05% |
| Tinuvin 328 UVA | 0.00% | 0.00% | 0.00% | 0.00% | 0.00% |
| Tinuvin 783 UV HALS | 0.00% | 0.00% | 0.00% | 0.00% | 0.00% |
| Sabostab UV 119 (HALS) Hindered Amine | 0.00% | 0.00% | 0.00% | 0.00% | 0.00% |
| Songnox 11B PW AO | 0.00% | 0.00% | 0.00% | 0.00% | 0.00% |
| Pationic 930 Stearyl Lactylate | 0.00% | 0.00% | 0.00% | 0.00% | 0.00% |
| Sodium Bicarbonate | 0.00% | 0.00% | 0.00% | 0.00% | 0.00% |
| Talc 399 Talc | 0.00% | 0.00% | 0.00% | 0.00% | 0.00% |
| Mg—Al-Hydrotalcite | 0.00% | 0.00% | 0.00% | 0.00% | 0.00% |
| GASIL IJ45 Silica | 1.48% | 1.48% | 1.48% | 1.48% | 1.48% |
| Blanc Fix Barium Sulfate | 0.00% | 0.00% | 0.00% | 0.00% | 0.00% |
| Surlyn 8940 Sodium Ionomer | 0.00% | 0.00% | 9.85% | 9.85% | 19.70% |
| Surlyn 6320 Magnesium Ionomer | 0.00% | 0.00% | 0.00% | 0.00% | 0.00% |
| Surlyn 9910 Zinc Ionomer | 0.00% | 0.00% | 0.00% | 0.00% | 0.00% |
| Surlyn 1857 Zinc Ionomer | 0.00% | 0.00% | 0.00% | 0.00% | 0.00% |
| Nylon 12 | 0.00% | 0.00% | 0.00% | 0.00% | 0.00% |
| E43 MAH coupling agent | 0.00% | 0.00% | 0.00% | 0.00% | 0.00% |
| E25 MAH coupling agent | 0.00% | 0.00% | 0.00% | 0.00% | 0.00% |
| Color pigment | 0.00% | 0.00% | 0.00% | 0.00% | 0.00% |
| Total | 100% | 100% | 100% | 100% | 100% |
| Ratio of HDPE:Surlyn Ionomer | Infinity | Infinity | 9.0 | 9.0 | 4.0 |
| Product Form | Pellets | Pellets | Pellets | Pellets | Pellets |
| Low Gloss Compounded Pellets | 98% | 98% | 98% | 98% | 98% |
| Cedar Coloration | 2% | 2% | 2% | 2% | 2% |
| Total | 100% | 100% | 100% | 100% | 100% |
| Product Form | Brabender Strips | Brabender Strips | Brabender Strips | Brabender Strips | Brabender Strips |
| Gloss Angles - Brabender Strips (Average of Four Test Strips) | | | | | |
| 85° | 40.8 | 13.8 | 14.1 | 22.3 | 26.7 |

TABLE 6

Part B

|  | Example F | Example G | Example H | Example I | Example J |
|---|---|---|---|---|---|
| 0.38 melt pellet HDPE | 63.05% | 17.73% | 70.94% | 15.76% | 63.05% |
| 7 melt pellet HDPE | 0.00% | 0.00% | 0.00% | 0.00% | 0.00% |
| 0.5 melt flake HDPE | 0.00% | 0.00% | 0.00% | 0.00% | 0.00% |
| 0.8 melt flake HDPE | 15.76% | 70.94% | 17.73% | 63.05% | 15.76% |
| Tinuvin 328 UVA | 0.00% | 0.00% | 0.00% | 0.00% | 0.00% |
| Tinuvin 783 UV HALS | 0.00% | 0.00% | 0.00% | 0.00% | 0.00% |
| Sabostab UV 119 (HALS) Hindered Amine | 0.00% | 0.00% | 0.00% | 0.00% | 0.00% |
| Songnox 11B PW AO | 0.00% | 0.00% | 0.00% | 0.00% | 0.00% |
| Pationic 930 Stearyl Lactylate | 0.00% | 0.00% | 0.00% | 0.00% | 0.00% |
| Sodium Bicarbonate | 0.00% | 0.00% | 0.00% | 0.00% | 0.00% |
| Talc 399 Talc | 0.00% | 0.00% | 0.00% | 0.00% | 0.00% |
| Mg—Al-Hydrotalcite | 0.00% | 0.00% | 0.00% | 0.00% | 0.00% |
| GASIL IJ45 Silica | 1.48% | 1.48% | 1.48% | 1.48% | 1.48% |
| Blanc Fix Barium Sulfate | 0.00% | 0.00% | 0.00% | 0.00% | 0.00% |
| Surlyn 8940 Sodium Ionomer | 19.70% | 0.00% | 0.00% | 0.00% | 0.00% |
| Surlyn 6320 Magnesium Ionomer | 0.00% | 9.85% | 9.85% | 19.70% | 19.70% |
| Surlyn 9910 Zinc Ionomer | 0.00% | 0.00% | 0.00% | 0.00% | 0.00% |
| Surlyn 1857 Zinc Ionomer | 0.00% | 0.00% | 0.00% | 0.00% | 0.00% |
| Nylon 12 | 0.00% | 0.00% | 0.00% | 0.00% | 0.00% |
| E43 MAH coupling agent | 0.00% | 0.00% | 0.00% | 0.00% | 0.00% |
| E25 MAH coupling agent | 0.00% | 0.00% | 0.00% | 0.00% | 0.00% |
| Color pigment | 0.00% | 0.00% | 0.00% | 0.00% | 0.00% |
| Total | 100% | 100% | 100% | 100% | 100% |
| Ratio of HDPE:Surlyn Ionomer | 4.00 | 9.00 | 9.00 | 4.00 | 4.00 |
| Product Form | Pellets | Pellets | Pellets | Pellets | Pellets |
| Low Gloss Compounded Pellets | 98% | 98% | 98% | 98% | 98% |
| Cedar Coloration | 2% | 2% | 2% | 2% | 2% |
| Total | 100% | 100% | 100% | 100% | 100% |
| Product Form | Brabender Strips | Brabender Strips | Brabender Strips | Brabender Strips | Brabender Strips |
| Gloss Angles - Brabender Strips (Average of Four Test Strips) | | | | | |
| 85° | 13 | 23.5 | 11.7 | 20.4 | 12.6 |

TABLE 6

Part C

|  | Example K | Example L | Example M | Example N | Example O |
|---|---|---|---|---|---|
| 0.38 melt pellet HDPE | 62.44% | 51.23% | 34.48% | 51.51% | 48.51% |
| 7 melt pellet HDPE | 0.00% | 0.00% | 0.00% | 0.00% | 0.00% |
| 0.5 melt flake HDPE | 0.00% | 0.00% | 0.00% | 0.00% | 0.00% |
| 0.8 melt flake HDPE | 15.61% | 34.48% | 51.23% | 34.34% | 32.34% |
| Tinuvin 328 UVA | 0.00% | 0.00% | 0.00% | 0.15% | 0.15% |
| Tinuvin 783 UV HALS | 0.00% | 0.00% | 0.00% | 0.40% | 0.40% |
| Sabostab UV 119 (HALS) Hindered Amine | 0.00% | 0.00% | 0.00% | 0.00% | 0.00% |
| Songnox 11B PW AO | 0.00% | 0.00% | 0.00% | 0.10% | 0.10% |
| Pationic 930 Stearyl Lactylate | 0.00% | 0.00% | 0.00% | 0.00% | 0.00% |
| Sodium Bicarbonate | 0.00% | 0.00% | 0.00% | 0.00% | 0.00% |
| Talc 399 Talc | 0.00% | 0.00% | 0.00% | 0.00% | 5.00% |
| Mg—Al-Hydrotalcite | 0.00% | 0.00% | 0.00% | 0.00% | 0.00% |
| GASIL IJ45 Silica | 2.44% | 1.48% | 1.48% | 2.00% | 2.00% |
| Blanc Fix Barium Sulfate | 0.00% | 0.00% | 0.00% | 1.50% | 1.50% |
| Surlyn 8940 Sodium Ionomer | 0.00% | 0.00% | 0.00% | 0.00% | 0.00% |
| Surlyn 6320 Magnesium Ionomer | 19.51% | 0.00% | 0.00% | 10.00% | 10.00% |
| Surlyn 9910 Zinc Ionomer | 0.00% | 0.00% | 0.00% | 0.00% | 0.00% |
| Surlyn 1857 Zinc Ionomer | 0.00% | 0.00% | 0.00% | 0.00% | 0.00% |
| Nylon 12 | 0.00% | 9.85% | 9.85% | 0.00% | 0.00% |
| E43 MAH coupling agent | 0.00% | 3.00% | 0.00% | 0.00% | 0.00% |
| E25 MAH coupling agent | 0.00% | 0.00% | 3.00% | 0.00% | 0.00% |
| Color pigment | 0.00% | 0.00% | 0.00% | 0.00% | 0.00% |
| Total | 100% | 100% | 100% | 100% | 100% |
| Ratio of HDPE:Surlyn Ionomer | 4.00 | Infinity | Infinity | 8.59 | 8.09 |

TABLE 6-continued

| Part C | | | | | |
|---|---|---|---|---|---|
| | Example K | Example L | Example M | Example N | Example O |
| Product Form | Pellets | Pellets | Pellets | Pellets | Pellets |
| Low Gloss Compounded Pellets | 98% | 98% | 98% | 98% | 98% |
| Cedar Coloration | 2% | 2% | 2% | 2% | 2% |
| Total | 100% | 100% | 100% | 100% | 100% |
| Product Form | Brabender Strips | Brabender Strips | Brabender Strips | Brabender Strips | Brabender Strips |
| Gloss Angles - Brabender Strips (Average of Four Test Strips) | | | | | |
| 85° | 12.2 | 5.9 | 2.2 | 7.2 | 8.9 |

TABLE 6

| Part D | | | | | |
|---|---|---|---|---|---|
| | Example P | Example Q | Example R | Example S | Example T |
| 0.38 melt pellet HDPE | 42.51% | 0.00% | 18.95% | 67.83% | 45.33% |
| 7 melt pellet HDPE | 0.00% | 58.00% | 0.00% | 0.00% | 0.00% |
| 0.5 melt flake HDPE | 0.00% | 19.36% | 0.00% | 0.00% | 0.00% |
| 0.8 melt flake HDPE | 28.34% | 0.00% | 75.79% | 16.96% | 30.22% |
| Tinuvin 328 UVA | 0.15% | 0.15% | 0.15% | 0.15% | 0.15% |
| Tinuvin 783 UV HALS | 0.40% | 0.40% | 0.40% | 0.40% | 0.00% |
| Sabostab UV 119 (HALS) Hindered Amine | 0.00% | 0.00% | 0.00% | 0.00% | 0.40% |
| Songnox 11B PW AO | 0.10% | 0.10% | 0.10% | 0.10% | 0.15% |
| Pationic 930 Stearyl Lactylate | 0.00% | 0.00% | 0.00% | 0.00% | 0.00% |
| Sodium Bicarbonate | 0.00% | 0.00% | 0.00% | 0.00% | 0.25% |
| Talc 399 Talc | 5.00% | 20.00% | 0.00% | 10.00% | 0.00% |
| Mg—Al-Hydrotalcite | 0.00% | 0.00% | 0.00% | 0.00% | 0.00% |
| GASIL IJ45 Silica | 2.00% | 0.00% | 1.50% | 1.50% | 2.00% |
| Blanc Fix Barium Sulfate | 1.50% | 0.00% | 1.50% | 1.50% | 1.50% |
| Surlyn 8940 Sodium Ionomer | 0.00% | 0.00% | 0.00% | 0.00% | 0.00% |
| Surlyn 6320 Magnesium Ionomer | 20.00% | 0.00% | 0.00% | 0.00% | 0.00% |
| Surlyn 9910 Zinc Ionomer | 0.00% | 0.00% | 0.00% | 0.00% | 20.00% |
| Surlyn 1857 Zinc Ionomer | 0.00% | 0.00% | 0.00% | 0.00% | 0.00% |
| Nylon 12 | 0.00% | 0.00% | 0.00% | 0.00% | 0.00% |
| E43 MAH coupling agent | 0.00% | 0.00% | 0.00% | 0.00% | 0.00% |
| E25 MAH coupling agent | 0.00% | 0.00% | 0.00% | 0.00% | 0.00% |
| Color pigment | 0.00% | 1.90% | 1.61% | 1.56% | 0.00% |
| Total | 100% | 100% | 100% | 100% | 100% |
| Ratio of HDPE:Surlyn Ionomer | 3.54 | Infinity | Infinity | Infinity | 3.78 |
| Product Form | Pellets | Brabender Strips | Brabender Strips | Brabender Strips | Pellets |
| Low Gloss Compounded Pellets | 98% | | | | 98% |
| Cedar Coloration | 2% | | | | 2% |
| Total | 100% | | | | 100% |
| Product Form | Brabender Strips | | | | Brabender Strips |
| Gloss Angles - Brabender Strips (Average of Four Test Strips) | | | | | |
| 85° | 7.7 | 49.8 | 17.2 | 10.3 | 14.2 |

TABLE 6

| Part E | | | | | |
|---|---|---|---|---|---|
| | Example U | Example V | Example W | Example 1 | Example X |
| 0.38 melt pellet HDPE | 45.51% | 44.54% | 44.57% | 45.36% | 45.51% |
| 7 melt pellet HDPE | 0.00% | 0.00% | 0.00% | 0.00% | 0.00% |
| 0.5 melt flake HDPE | 0.00% | 0.00% | 0.00% | 0.00% | 0.00% |
| 0.8 melt flake HDPE | 30.34% | 29.69% | 29.72% | 30.24% | 30.34% |
| Tinuvin 328 UVA | 0.15% | 0.15% | 0.15% | 0.15% | 0.15% |
| Tinuvin 783 UV HALS | 0.40% | 0.40% | 0.40% | 0.00% | 0.40% |
| Sabostab UV 119 (HALS) Hindered Amine | 0.00% | 0.00% | 0.00% | 0.40% | 0.00% |
| Songnox 11B PW AO | 0.10% | 0.10% | 0.10% | 0.15% | 0.10% |
| Pationic 930 Stearyl Lactylate | 0.00% | 0.00% | 0.00% | 0.20% | 0.00% |

TABLE 6-continued

Part E

|  | Example U | Example V | Example W | Example 1 | Example X |
|---|---|---|---|---|---|
| Sodium Bicarbonate | 0.00% | 0.00% | 0.00% | 0.00% | 0.00% |
| Talc 399 Talc | 0.00% | 0.00% | 0.00% | 0.00% | 0.00% |
| Mg—Al-Hydrotalcite | 0.00% | 0.00% | 0.00% | 0.00% | 0.00% |
| GASIL IJ45 Silica | 2.00% | 2.00% | 2.00% | 2.00% | 2.00% |
| Blanc Fix Barium Sulfate | 1.50% | 1.50% | 1.50% | 1.50% | 1.50% |
| Surlyn 8940 Sodium Ionomer | 0.00% | 0.00% | 0.00% | 0.00% | 0.00% |
| Surlyn 6320 Magnesium Ionomer | 20.00% | 20.00% | 20.00% | 0.00% | 20.00% |
| Surlyn 9910 Zinc Ionomer | 0.00% | 0.00% | 0.00% | 0.00% | 0.00% |
| Surlyn 1857 Zinc Ionomer | 0.00% | 0.00% | 0.00% | 20.00% | 0.00% |
| Nylon 12 | 0.00% | 0.00% | 0.00% | 0.00% | 0.00% |
| E43 MAH coupling agent | 0.00% | 0.00% | 0.00% | 0.00% | 0.00% |
| E25 MAH coupling agent | 0.00% | 0.00% | 0.00% | 0.00% | 0.00% |
| Color pigment | 0.00% | 1.61% | 1.56% | 0.00% | 0.00% |
| Total | 100% | 100% | 100% | 100.00% | 100% |
| Ratio of HDPE:Surlyn Ionomer | 3.79 | 3.71 | 3.71 | 3.78 | 3.79 |
| Product Form | Pellets | Brabender Strips | Brabender Strips | Pellets | Pellets |
| Low Gloss Compounded Pellets | 98% | | | 98% | 98% |
| Cedar Coloration | 2% | | | 2% | 2% |
| Total | 100% | | | 100% | 100% |
| Product Form | Brabender Strips | | | Brabender Strips | Brabender Strips |
| Gloss Angles - Brabender Strips (Average of Four Test Strips) | | | | | |
| 85° | | 5.0 | 3.4 | 7.7 | 5.2 |
| QUV Weathering (Brabender Strips) CIELAB Delta E | | | | | |
| 500 hours | | | | 1.02 | 1.03 |
| 1000 hours | | | | 1.36 | 1.69 |
| 1500 hours | | | | | |
| 2000 hours | | | | 1.35 | 2.42 |

TABLE 6

Part F

|  | Example 2 | Example 3 | Example 4 |
|---|---|---|---|
| 0.38 melt pellet HDPE | 45.36% | 45.36% | 45.33% |
| 7 melt pellet HDPE | 0.00% | 0.00% | 0.00% |
| 0.5 melt flake HDPE | 0.00% | 0.00% | 0.00% |
| 0.8 melt flake HDPE | 30.24% | 30.24% | 30.22% |
| Tinuvin 328 UVA | 0.15% | 0.15% | 0.15% |
| Tinuvin 783 UV HALS | 0.00% | 0.00% | 0.00% |
| Sabostab UV 119 (HALS) Hindered Amine | 0.40% | 0.40% | 0.40% |
| Songnox 11B PW AO | 0.15% | 0.15% | 0.15% |
| Pationic 930 (Stearyl Lactylate) | 0.20% | 0.20% | 0.00% |
| Sodium Bicarbonate | 0.00% | 0.00% | 0.00% |
| Talc 399 Talc | 0.00% | 0.00% | 0.00% |
| Mg—Al-Hydrotalcite | 0.00% | 0.00% | 0.25% |
| GASIL IJ45 Silica | 2.00% | 2.00% | 2.00% |
| Blanc Fix Barium Sulfate | 1.50% | 1.50% | 1.50% |
| Surlyn 8940 Sodium Ionomer | 0.00% | 0.00% | 0.00% |
| Surlyn 6320 Magnesium Ionomer | 20.00% | 0.00% | 0.00% |
| Surlyn 9910 Zinc Ionomer | 0.00% | 20.00% | 20.00% |
| Surlyn 1857 Zinc Ionomer | 0.00% | 0.00% | 0.00% |
| Nylon 12 | 0.00% | 0.00% | 0.00% |
| E43 MAH coupling agent | 0.00% | 0.00% | 0.00% |
| E25 MAH coupling agent | 0.00% | 0.00% | 0.00% |
| Color pigment | 0.00% | 0.00% | 0.00% |
| Total | 100% | 100% | 100% |
| Ratio of HDPE:Surlyn Ionomer | 3.78 | 3.78 | 3.78 |
| Product Form | Pellets | Pellets | Pellets |
| Low Gloss Compounded Pellets | 98% | 98% | 98% |
| Cedar Coloration | 2% | 2% | 2% |
| Total | 100% | 100% | 100% |
| Product Form | Brabender Strips | Brabender Strips | Brabender Strips |
| Gloss Angles - Brabender Strips (Average of Four Test Strips) | | | |
| 85° | 5.6 | 9 | 4.4 |
| QUV Weathering (Brabender Strips) CIELAB Delta E | | | |
| 500 hours | 0.45 | 0.99 | 0.26 |
| 1000 hours | 0.63 | 0.92 | 0.17 |
| 1500 hours | | | 0.12 |
| 2000 hours | 0.80 | 0.87 | 0.09 |

From Comparative Examples A-X, a tortuous path was taken to find Examples 1-4 to demonstrate that a capstock compound can be prepared which has low gloss, is toughened by the inclusion of an ionomer thermoplastic resin, and is protected by presence of an acid scavenger. Each Comparative Example demonstrated the false leads and dead ends overcome to achieve this invention. Table 6, Parts A-F, explains that journey.

In order to obtain a capstock which has low gloss, the Specular Gloss measures, using ASTM D523 and D2457 test standards, of a surface of the compound needed to be less than 10 at an 85° angle. Examples 1-4 are the only examples which meet this low gloss requirement and contain ionomer thermoplastic resin for toughness, protected by acid scavengers.

Comparative Examples A-X demonstrated the unexpectedness of the present invention. In order to obtain a tough capstock for use in exterior decking and other construction, the compound requires the use of an ionomer thermoplastic resin, such as Surlyn™ brand ionomer thermoplastic resin. Comparison Examples A, B, L, M, Q, R and S fail this criterion. They contain no ionomer thermoplastic resin to provide additional hardness. It is true that Comparison Examples L and M satisfy the low gloss requirement, but because they have no ionomer thermoplastic resin present they are disqualified.

Comparative Examples C, D, E, and F, which comprise a sodium-based ionomer thermoplastic resin, are disqualified because their gloss values are too high. Examples 1-4 use a magnesium- or zinc-based ionomer thermoplastic resin, and meet the required lower gloss values. Thus, it has been found that either a magnesium- or zinc-based ionomer thermoplastic resin is necessary to be used in the compound, as compared with sodium-based ionomer thermoplastic resin.

Comparative Examples G-K are disqualified because their 85° gloss values are too high. These Comparison Examples G-K differ from Examples 1-4, in that barium sulfate is not present. Therefore, it has been found that barium sulfate is also significant to the performance of low gloss.

Comparative Example T detrimentally foamed during processing and, therefore, was disqualified.

What differs in Examples 1-4 from Comparison Examples O, P, and S is that the latter three have talc present but no acid scavengers. Thus, it has been found that the compounds, which are proven by Examples 1-4 to have low gloss, need to have acid scavengers present.

Comparative Examples N, U, V, W, and X also do not have acid scavengers, which are required when using a metal-based ionomer in order to provide durability during use. Indeed Comparative Examples W and X do have a satisfactory gloss values, but the absence of an acid scavenger disqualifies them because the capstocks made from those compounds will not be durable long enough in the building and construction useful life for decking, fencing, stairways, railings, etc.

Examples 1-4 were pelletized and could be prepared into test strips without pigment as a contrasting agent for determining gloss values. Thus, pigment is optional but preferable when there is a desire to simulate the coloration of natural wood species.

Through this extensive study of Comparative Examples and successful Examples, it was found that a combination of factors contribute to the successful low gloss values in a toughened polyethylene capstock compound, namely:
polyethylene in both pellet form and powder or flake form;
magnesium- or zinc-based ionomer thermoplastic resin;
acid scavenger;
silica; and
barium sulfate.

Therefore, Examples 1-4 were determined to be very acceptable for use as a capstock compound in the building and construction industry. Of them, Example 4 was preferred because of its excellent weathering result.

The pellets of Examples 1-4 were further tested by melt mixing 98 weight percent of those pellets with two percent of black colorant and then injection molding the mixture using a 120 ton injection molding machine, at temperature settings of 200° C., to make test plaques of the dimensions of 14 cm long×9 cm wide×3 cm thick. Again, the compounds of Examples 1-4 with black colorant achieved 85° Gloss Angle of less than 10. The compounds for such plaques were measured for Shore D Hardness using ASTM Test D2240 and Drop Dart Impact using ASTM Test D5420. Table 7 shows the results. The failure of Example 3 in Drop Dart Impact reduces the versatility of that particular formulation.

Among Examples 1-4, a marketable difference was seen in the results of a Ford Motor Company test specification (Ford BN 108-13) "Five Finger or Five Arm Scratch Test" using a Taber™ Model 710 Multi-Finger Scratch/Mar Tester. Using the molded black-colored plaques, the test results for Examples 1-4 are also shown in Table 7 and demonstrated a preference of Example 4 over Examples 1-3 because a scratch/mar result of "4" is not acceptable for uses in the market on plastic articles where resistance to scratch and mar are also important.

TABLE 7

|  | Example 1 | Example 2 | Example 3 | Example 4 |
|---|---|---|---|---|
| Low Gloss Compounded Pellets | 98% | 98% | 98% | 98% |
| Black Coloration | 2% | 2% | 2% | 2% |
| Total | 100% | 100% | 100% | 100% |
| Product Form | Brabender Strips | Brabender Strips | Brabender Strips | Brabender Strips |
| Gloss Angles - Brabender Strips | | | | |
| 85° | 5.7 | 5.8 | 5.8 | 5.3 |
| Shore D Durometer Hardness | | | | |
|  | 58 | 56 | 60 | 62 |
| Drop Dart Impact | | | | |
| Passing Rate | 5 for 5 | 5 for 5 | 0 for 5 | 4 for 5 |
| Ford Scratch Test (Ford BN 108-13) | | | | |
| 7 Newtons | 1 | 1 | 0 | 0 |
| 10 Newtons | 2 | 2 | 1 | 1 |
| 15 Newtons | 3 | 3 | 3 | 2 |
| 20 Newtons | 4 | 4 | 4 | 3 |

With 24 different Comparative Examples and 4 Examples of the invention, a person having ordinary skill in the art, without undue experimentation, will be able to formulate a low gloss and durable capstock compound to achieve the particular physical properties desired.

The invention is not limited to the above embodiments. The claims follow.

What is claimed is:

1. A low gloss capstock compound extrudable into the form of a capstock, comprising:
   (a) polyethylene in both pellet form and flake form;
   (b) metal-based ionomer thermoplastic resin, wherein the metal is selected from the group consisting of magnesium and zinc;
   (c) acid scavenger for the metal-based ionomer thermoplastic resin;
   (d) gloss inhibiting agents comprising both silica and barium sulfate; and
   (e) weathering agents comprising hindered amine light stabilizer, wherein the hindered amine light stabilizer is selected from the group consisting of N,N',N'',N'''-tetrakis(4,6-bis(butyl-(N-methyl-2,2,6,6-tetramethylpiperidin-4-yl)amino)triazin-2-yl)-4,7-diazadecan-1,10-diamine and Butanedioic acid, dimethyl ester, polymer with 4-hydroxy-2,2,6,6-tetramethyl-1-piperidineethanol,
   wherein (a) polyethylene and (b) metal-based ionomer thermoplastic resin have a ratio of about 4:1 to about 8:1 and the polyethylene is at least 75 weight percent of the compound, wherein, when a surface of a strip of the compound is tested according to ASTM D523, D2457, the surface has a Gloss Angle at 85° of less than 10 GU and less than 2 Delta E CIELAB color change after 2000 hours of QUV weathering.

2. The compound of claim 1, wherein the compound further optionally comprises both additional weathering agents comprising ultra-violet light absorber and anti-oxidant and (f) colorant;

wherein (a) polyethylene is divided between pellets and flakes in a division ranging from about 80:20 to about 50:50 pellets: flakes, and wherein the compound has ingredients in the range of weight percents of the compound:

| (i) | Polyethylene (pellet form) | 45-53 |
| --- | --- | --- |
| (ii) | Polyethylene (flake form) | 28-38 |
| (iii) | Metal-based Ionomer Thermoplastic Resin | 5-25 |
| (iv) | Acid Scavenger | 0.1-0.4 |
| (v) | Silica Gloss Inhibiting Agent | 1-5 |
| (vi) | Barium Sulfate Gloss Inhibiting Agent | 1-3 |
| (vii) | Ultra-violet Light Absorber | 0-0.3 |
| (viii) | Hindered Amine Light Stabilizer | 0.1-0.5 |
| (ix) | Anti-Oxidant | 0.1-0.3 |
| (x) | Colorant | 1-4. |

3. The compound of claim 1, wherein the compound further optionally comprises both additional weathering agents comprising ultra-violet light absorber and anti-oxidant and (f) colorant; and wherein the compound is a masterbatch and has ingredients in the range of weight percents of the masterbatch, based on a 25% usage level in a final low gloss capstock compound:

| (i) | Polyethylene (pellet form): 0-15 |
| --- | --- |
| (ii) | Polyethylene (flake form): 15-40 |
| (iii) | Metal-based Ionomer Thermoplastic Resin: 40-80 |
| (iv) | Acid Scavenger: 1-3 |
| (v) | Silica Gloss Inhibiting Agent: 5-15 |
| (vi) | Barium Sulfate Gloss Inhibiting Agent: 4-14 |
| (vii) | Ultra-violet Light Absorber: 0.25-3 |
| (viii) | Hindered Amine Light Stabilizer: 0.5-5 |
| (ix) | Anti-Oxidant: 0.1-3 |
| (x) | Colorant: 0-35. |

4. The compound of claim 2 further comprising colorant.

5. The compound of claim 4, further comprising other additives selected from the group consisting of biocides; surfactants; intercalated organoclays; anti-static agents; bonding, blowing and foaming agents; dispersants; fillers and extenders; fire and flame retardants and smoke suppressants; fly ash; impact modifiers; initiators; lubricants; micas; plasticizers; processing aids; release agents; silanes, titanates and zirconates; slip and anti-blocking agents; stabilizers; stearates; ultraviolet light absorbers; viscosity regulators; waxes; pest repellants; and combinations of them.

6. The compound of claim 2,
wherein the ultra-violet light absorber is 2-(2H-benzotriazol-2-yl)-4,6-ditertpentylphenol; and
wherein the anti-oxidant is a mixture of Tris(2,4-di-tert-butylphenyl)phosphite and Tetrakis[methylene-3-(3,5-di-tert-butyl-4-hydroxyphenyl)propionate]methane in a 50:50 weight ratio.

7. The compound of claim 3,
wherein the ultra-violet light absorber is 2-(2H-benzotriazol-2-yl)-4,6-ditertpentylphenol; and
wherein the anti-oxidant is a mixture of Tris(2,4-di-tert-butylphenyl)phosphite and Tetrakis[methylene-3-(3,5-di-tert-butyl-4-hydroxyphenyl)propionate]methane in a 50:50 weight ratio.

8. The compound of claim 1, wherein each of the two different forms of polyethylene has a melt flow index of 0.2 to 0.8 g/10 min, when measured using ASTM D1238 (2.16 kg at 190° C.), and wherein each of the two different forms of polyethylene has a density of from about 0.93 to about 0.97 g/cm3.

9. The compound of claim 1, wherein the metal-based ionomer thermoplastic resin is zinc-based ionomer thermoplastic resin, and wherein the acid scavenger is magnesium-aluminum synthetic hydrotalcite.

10. The compound of claim 1, wherein the silica has a particle size ranging from about 5 to about 12 micrometers, wherein the barium sulfate has a particle size ranging from about 0.5 to about 5 micrometers.

11. The compound of claim 1, wherein the compound is extruded in the form of a capstock attached or adhered to a substrate.

12. A capstock made from the compound of claim 1.

13. The capstock of claim 12, wherein the compound further comprises additional weathering agents comprising ultra-violet light absorber and anti-oxidant; and wherein the capstock has a first surface attached or adhered to a substrate and a second surface exposed to sunlight.

14. The capstock of claim 13, wherein the second surface has and less than 2 Delta E CIELAB color change after 2000 hours of QUV weathering.

15. The capstock of claim 12, wherein the substrate is a building or construction item.

* * * * *